Aug. 30, 1932.   A. M. MacFARLAND   1,875,066
WELDING MACHINE
Filed Nov. 19, 1929
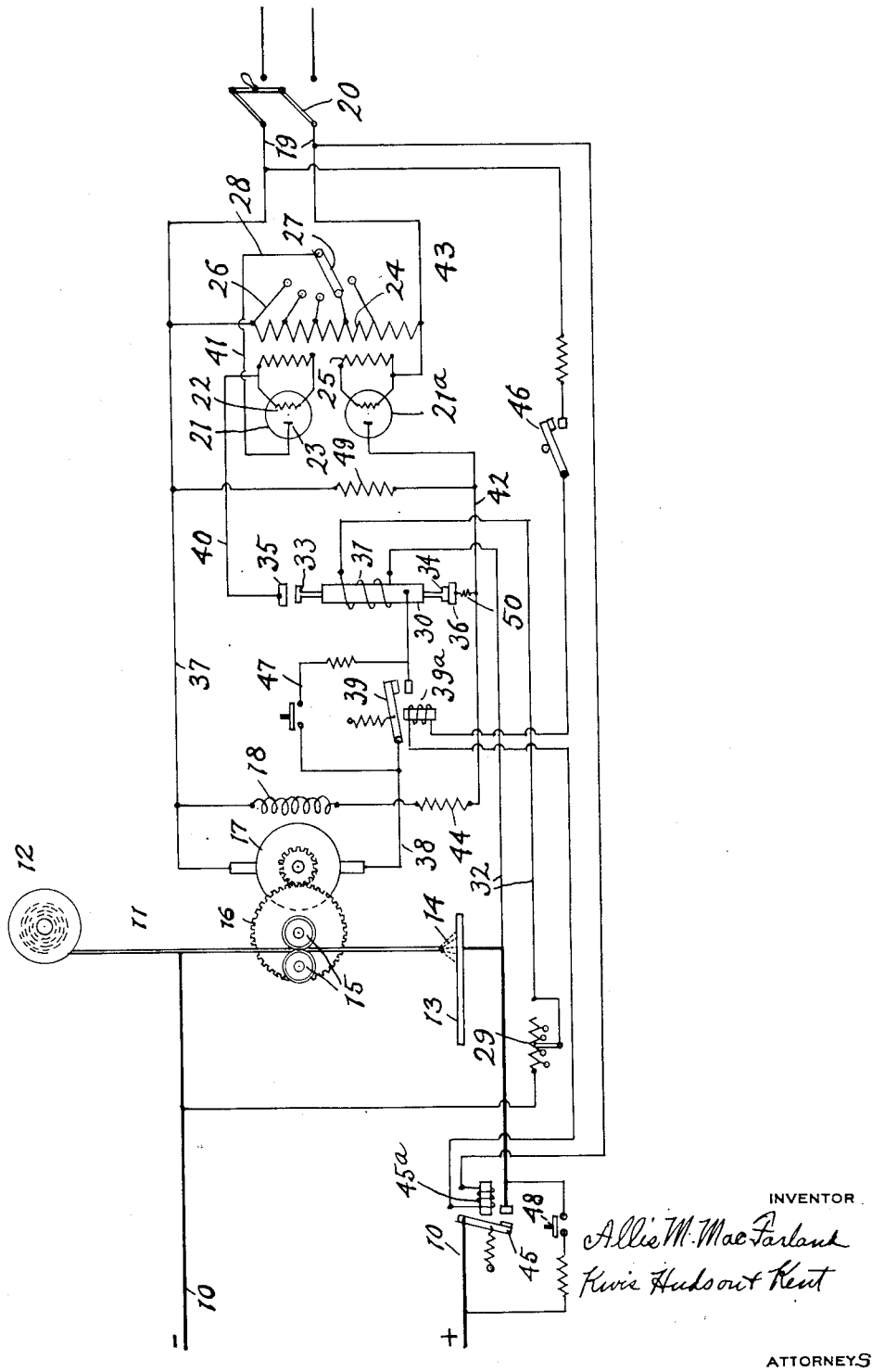

Patented Aug. 30, 1932

1,875,066

UNITED STATES PATENT OFFICE

ALLIS M. MacFARLAND, OF DETROIT, MICHIGAN, ASSIGNOR TO THE REFLEX ELECTRICAL PRODUCTS COMPANY, OF CLEVELAND, OHIO, A CORPORATION OF OHIO

WELDING MACHINE

Application filed November 19, 1929. Serial No. 408,246.

This invention relates to automatic welding machines of the type wherein a wire electrode is fed to the arc.

More particularly, the invention relates to improved means for feeding the wire to the arc and for regulating the speed at which the wire is fed, the purpose being to maintain the arc of constant length regardless of the rate of fusion or irregularities on the surface of the work to be welded.

It is common in the art to feed the wire to the arc by feeding rolls, and to vary the rate of rotation of the feeding rolls and in some instances their direction of rotation by various methods and instrumentalities which generally operate by control mechanism responsive to changes in the arc voltage. In some of these devices a relay or contactor is utilized which cuts resistance into and out of the motor circuit so as to vary the motor speed. In others, various clutch mechanisms are utilized to disconnect the motor from the drive gear or to reverse the rotation of the latter so as to feed the wire toward or from the arc as the voltage conditions across the arc may require.

These machines give fairly good results but none of them, so far as I am aware, are in all respects satisfactory as they require a good deal of fine adjustment and maintenance expense, and it is quite difficult to secure a smooth and regular feeding action. In some instances the machine is sluggish in its action and not sufficiently sensitive to changes in the arc voltage, with the result that the machine does not respond to slight changes in arc voltage and does not act quickly enough to meet rapidly fluctuating conditions in the length of the arc.

The principal object of the present invention is to provide a welding machine of the type before referred to which is more satisfactory and practical in its operation. Further, the invention aims to overcome the disadvantages, noted above, of the prior machines employed for this purpose, also to provide a machine which is free from clutches and other mechanical or electromechanical operating parts likely to give trouble and which is inexpensive to build and simple and durable in its operation.

More particularly, it is the aim of the invention to provide a machine wherein the motor for feeding the wire is more quickly responsive to changes in the arc voltage.

A still further object is to provide means whereby the motor speed can be quickly increased or decreased to suit any fluctuating condition of the arc and, under extreme conditions to be quickly reversed without disastrous or serious sparking at the contactor or make-and-break device which is utilized by me in effecting the rapid speed changes or reversal in the direction of rotation of the motor.

Briefly considered, my invention contemplates a method of motor control responsive to changes in arc voltage which cuts off the current altogether when reduced speed is desired so that the motor may coast temporarily instead of being driven at a lower speed by a reduction in the voltage impressed on the motor, the current being cut off entirely and again supplied at the full predetermined voltage (which can be adjusted to suit conditions) at the necessary rapid rate to effect the desired changes in the rate of feed of the wire. Additionally, by my method of control, the current can be readily reversed through the motor, so as to obtain a strong braking action, and under extreme conditions, to actually reverse the direction of feed.

In another aspect, the invention resides in the means by which the above can be accomplished without causing disastrous sparking at the contacts as the current is rapidly applied and shut off or reversed. It also insures sparkless commutation of the D. C. motor under heavy loads.

It is still another feature of my invention that the voltage of the current supplied to the motor may be readily changed and adjusted so that the maximum speed of the motor and the wire feeding rollers driven thereby will have a certain practical relation to the rate of fusion of the wire. Furthermore, this method of regulating the motor speed by frequently and rapidly cutting on and off the motor power or supplying reverse impulses as indicated by the momentary requirements of the arc, thus provides a feeding system that avoids any normal or fixed running speed, but is constantly alert and changing to correspond to the fluctuating requirements of the arc, its purpose and effect being to maintain the arc length at a constant and predetermined length.

The invention may be further briefly summarized as consisting in certain novel combinations and arrangements of parts which will be described in the specification and set forth in the appended claims.

In the accompanying drawing, the single figure is a diagrammatic representation of a system involving the several features of my invention in one of its embodiments, the various parts of the system or machine, including the motor, gearing and feed rolls, being shown in conventional manner.

Referring now to the drawing, 10 represents the conductors of a D. C. circuit for supplying the welding current. The fusible wire which is fed to the arc is indicated at 11, this wire being generally led from a reel 12 and being fed toward the work 13, the arc being indicated at 14. The wire is fed by suitable feed rolls 15 actuated by any suitable reduction gearing, indicated at 16, and driven by a motor 17 which may be a standard D. C. motor, the motor having a field winding 18.

It was stated before that it is one of the features of the invention that the motor speed is controlled by stopping entirely and starting the flow of current through the motor, which certain advantages over the method of varying the motor speed by maintaining the flow of current uninterrupted and varying the voltage impressed on the motor. It was stated also that it is another feature of the invention that in my improved welding machine the rapid breaking and making of the circuit for supplying current to the motor is accomplished by my improvements without serious sparking at the contacts of the make-and-break device. In carrying out these important features or parts of my invention, I preferably keep the field of the motor constantly energized and make and break and reverse the current which is passed through the motor armature. Furthermore, in accordance with my invention the current supplied to both the field and the armature of the motor is derived from a standard A. C. power circuit by the use of two rectifiers of suitable form, each rectifying one-half of the wave, and from the supply circuit and these two rectifiers two circuits are established, each adapted to supply to the motor armature a pulsating or intermittent direct current, one flowing in one direction for rotating the motor in one direction, and the other in the reverse direction for rotating it in the opposite direction or for supplying the braking effect in the event that the direction of rotation is not actually reversed. With this brief explanation, reference is again had to the drawing.

The conductors for supplying the A. C. current are indicated at 19, there being provided in these conductors a suitable controlling switch 20. For separately rectifying and delivering into the different circuits the opposite halves of the waves of the alternating current, I may employ any of the numerous standard rectifiers. For convenience, I have indicated at 21 and 21a two rectifiers known in the trade as "rectagon" rectifiers, each consisting, as is well known, of a one-way valve in the form of a tube from which the air is exhaused and containing a positive terminal in the form of a heating filament 22 and a negative terminal in the form of a button 23. The filaments are preferably inductively related to a suitable inductive resistance or primary 24 of a transformer, the one shown being of the choke coil type, connected between the A. C. supply conductors 19, the filaments each being connected in a circuit containing a secondary 25 inductively related to the primary 24. From various points of the primary 24, taps 26 are brought out to buttons engageable with a contact arm 27 which is connected by a conductor 28 to one of the rectifier terminals 23. By this transformer, the voltage which is supplied to the motor armature can be conveniently regulated, but I wish it to be understood that this transformer is not essential to the invention and that any other suitable type of voltage regulating means may be employed. It may be noted that the transformer is shown with its regulating arm connected to only one of the rectifiers, the one that supplies current by the way of contacts 33, 35 to the motor in the direction to feed the welding wire downward to the arc. This is because while it is desirable to regulate the maximum downward feed of the wire to roughly approximate the fusion rate of the wire plus a certain allowance for regulation, it is not necessary to regulate or change the speed at which the motor travels in the reverse direction. The reverse circuit takes full line voltage modified to a practical working condition by a series resistance 50 if necessary.

Before describing the circuits by which the intermittent or pulsating D. C. current is supplied to the motor armature, it might first be mentioned that these circuits are made and broken and the current supply changed from one circuit to the other for forward and reverse rotation of the motor by means of a make and break device here illustrated as of the solenoid type and comprising a plunger 30 having a winding 31 connected by conductors 32 to opposite sides of the arc 14, i. e., to the conductors for supplying the welding current to the arc. The plunger 30 has at opposite ends contacts 33 and 34 adapted to engage respectively an upper stationary contact 35 and a lower stationary contact 36. It will be understood that on the lengthening of the arc and therefore increase in the voltage impressed upon the solenoid winding 31, the plunger will be elevated so as to bring the contacts 33 and 35 into engagement, and on the shortening of the arc and the lowering of the voltage impressed upon the solenoid winding, the plunger will drop by gravity so as to separate the contacts 33 and 35 and cause engagement between the contacts 34 and 36. The arc voltage necessary to raise the plunger is regulated by the variable resistance 29 interposed in the solenoid circuit. This resistance being set at a predetermined value, insures that the plunger will be elevated and cut off the motor current instantly whenever the arc voltage rises above the set value. In practice the average arc voltage desired may be of the order of twenty volts, and the solenoid plunger will rise or drop with less than one volt variation from this figure, either way.

Tracing now the circuit connections herein illustrated (the specific connections being not at all necessary to the proper working or functioning of my improved apparatus constructed on the principles herein described), one brush of the motor is connected by a conductor 37 to one of the main A. C. supplying conductors 19, in this instance the upper conductor. The other brush of the motor is connected by means of conductor 38 through a switch 39 to the plunger 30 and, therefore, to both the contacts 33 and 34 at the ends of the plunger. The upper stationary contact 35 is connected by a conductor 40 to the positive terminal of the rectifier 21, while the negative terminal of this rectifier is connected by a conductor 41 to the primary 24 of the transformer. The lower stationary contact 36 is connected by means of a conductor 42 to the negative terminal of the rectifier 21a. The positive terminal of this rectifier is connected by a conductor 43 to the other main A. C. current supply conductor, in this instance the lower conductor.

The field winding 18 has one terminal connected to the conductor 37, while its other terminal is shown connected through a resistance 44 to the conductor 42. Accordingly, as long as the machine is in operation, pulsating direct current will flow at all times in one direction through the field winding from one main current supply conductor 19 and by way of conductor 37 to one terminal of the field winding and from the other terminal of the field winding by conductor 42 and through rectifier 21a and conductor 43 to the other main A. C. current supplying conductor 19. Furthermore, it will be observed that when the plunger is elevated so that the contacts 33 and 35 are in engagement, a pulsating direct current will flow through the armature of the motor in one direction, this being in the direction to feed the wire downward or to the arc, the path of the current then being as follows: From the lower A. C. current supplying conductor 19 by conductor 28 and arm 27 of the voltage regulator to the primary, by conductor 41 to the negative terminal of the rectifier 21, and from the positive terminal of this rectifier by conductor 40 through the contacts 35, 33 to the plunger and by way of conductor 38 and switch 39 through the motor armature to the other main A. C. current supplying conductor by way of conductor 37. When the plunger is lowered so that the contacts 34 and 36 are in engagement, a pulsating direct current flows through the motor armature in the opposite direction. The circuit connections may be traced as follows: From the lower main current supplying conductor by conductor 43 to the positive terminal of the rectifier 21a, from the negative terminal of the rectifier by conductor 42 through the lower contacts 34, 36, and by way of conductor 38 and switch 39 through the motor armature and by conductor 37 to the other main A. C. current supplying conductor. Since the current passing through the armature is thus reversed, the latter tends to reverse and may reverse its direction of rotation to reverse the feed of the fusible wire 11, and, hence, to move it upward. However, the upward feed of the wire rarely occurs while the welding machine is working, the reversal of the current through the armature being utilized principally to cause a strong magnetic braking action on the motor to quickly check the downward feed of the wire.

It will be understood, of course, that the position of the solenoid core 30 determines the direction of feed of the armature current, the direction of rotation of the armature being such as to produce downward feed of the wire when the plunger is elevated and the contacts 33 and 35 are in engagement, and its rotation or tendency to rotate being in the opposite direction when the solenoid is lowered and the contacts 34 and 36 are in engagement. When the plunger is in central or neutral position with both sets of contacts out of engagement, as is the case at frequently occurring intervals during the welding operation, no current is supplied to the armature which thus coasts with tendency to quickly decelerate between intervals of current supply. Likewise, it will be understood that the position of the plunger 30 at any particular time in the welding operation depends upon the voltage impressed on the solenoid coil 31, and this, in turn, depends upon the condition or length of the arc 14.

In addition to the switch 39 in the motor armature circuit, a switch 45 is in the circuit of the welding current, i. e., in one of the conductors 10. Both of these switches are preferably closed magnetically and are biased toward open position by suitable springs or equivalent means, the coils for closing these switches being indicated at 39a and 45a respectively. Both of these switch closing coils may be in the same circuit controlled by one switch 46 and may be connected to any suitable source of current, such as the A. C. supply conductors 19. Of course, they may, if desired, be independently operable.

To permit the wire to be fed by the motor either up or down while the welding is not taking place, both switches 39 and 45 are shunted by normally open switches 47 and 48 which may be of the push button type. When the welding operation is not taking place, the solenoid coil 31 is normally deenergized and the plunger is in lowered position with the contacts 34 and 36 in engagement. If the operator desires to feed the wire upward, he simply closes the push button switch 47, whereupon current passes through the motor armature in the direction to cause it to drive the feed rolls so as to elevate the wire 11, it being understood that the field of the motor remains energized as long as the switch 20 is closed. If the operator wishes to feed the wire downward, he closes the push button switch 48. This energizes the solenoid coil 31, causing the plunger to be elevated so that upon closure of the push button switch 47 the current passes through the motor armature in a direction to rotate the feed rolls so as to feed the wire downward. I regard this simple means for manually controlling the feed of the wire through the operation of the motor while the welding operation is not taking place as an important adjunct of the invention as it adds greatly to its convenience.

A resistance element 49 permits a constant flow of current of small value through the rectifier 21a. This is maintained for the purpose of adding to the load flowing through the motor field 18 and increasing the total current through the rectifier 21a to a value that will insure its steady flow across the rectifying gap. Otherwise, without this "keep-alive" load, the field current alone would not be of sufficient amperage to establish and maintain a current flow through this type of rectifier.

To adjust the welding apparatus or machine for any particular rate of feed of the wire 11, the voltage regulator arm 27 will be so adjusted that the motor speed in the direction to feed the wire downward will be somewhat greater than required for the prescribed rate of feed of the wire. It can be made any desired amount faster but I prefer that it be only slightly faster since in that event the work performed by the make and break device is less. Furthermore, the adjustment of the regulator is preferably such that the voltage impressed on the motor for upward feed is somewhat greater than that impressed on the motor for downward feed. The purpose of this is to provide a strong magnetic braking action or an actual reversal of the motor so that the arc will be quickly lengthened when for any reason it tends to shorten.

In the normal operation, the pulsating current is supplied through the rectifier 21 so as to provide a downward feed of the wire, the supply of this pulsating current in the direction to produce the downward feed being rendered intermittent by the make and break device which moves up and down so as to make and break the contact between the contacts 33 and 35 fairly rapidly, thus causing torque impulses to be given to the motor armature with the motor coasting between current impulses. The major portion of the time that the wire is thus being fed, the contacts 34 and 36 do not engage but they do engage whenever the arc becomes too short and causes a sufficient drop in voltage impressed upon the solenoid coil 31, and the instant they engage, current is supplied in the opposite direction, with the result that the motor speed is very quickly reduced, and if the reduction in speed by this strong magnetic braking action is not sufficiently fast to bring about a quick lengthening of the arc by fusion of the wire, the motor will reverse for a very brief instant to positively feed the wire upward, this occurring in practice at intervals generally by reason of imperfections in the work. Thus the pulsating current is supplied intermittently to the motor armature in one direction and possibly alternately in opposite directions, the interruption in the current supply or both the interruption and reversal taking place rapidly by the movement of the solenoid plunger 31, due to changes in the voltage impressed on the solenoid coil 31. Notwithstanding this frequent interruption of the armature current, very little sparking occurs at the contacts 33, 35 and 34, 36 due to the character of the current which is supplied to the motor, for, by reason of the fact that it is a direct current of the pulsating type, the current pulsations are of very brief duration separated by intervals of no current supply. With an ordinary 60-cycle supply circuit, the current impulses are approximately 1/120 second in duration and the intervals of no current flow are of similar duration. Accordingly, no material sparking will occur at the contacts because of the briefness of the impulses, the current falling to zero before any considerable separation occurs between the contacts, irrespective of the point in the half-sinusoidal wave that the break is initiated. Of course, if the break is initiated between the impulse waves, there will be little if any sparking because of the fact that no current is flowing at that instant. This same characteristic of the current passing through the motor armature materially reduces the tendency to spark at the brushes when current is suddenly applied or reversed.

Thus it will be seen that I have provided two supply circuits derived from the A. C. circuit utilized in operating the motor in opposite directions, and by reason of the nature of the current which passes through each circuit, the interruption of the current or the change of supply from one circuit to the other is accomplished without any serious sparking. Thus the desired results are accomplished with apparatus requiring very little upkeep or maintenance expense and requiring very little adjusting and with simple apparatus.

While I have shown one embodiment of the invention which practice has demonstrated is very effective and possesses all the advantages enumerated in the early part of the specification, I do not wish to be confined to any of the details or parts specifically illustrated and described. The regulator and the rectifiers particularly are susceptible of modification in type and arrangement. I, therefore, aim in my claims to cover all modifications which do not involve a departure from the spirit and scope of my invention.

Having thus described my invention, I claim:

1. In a welding system wherein a welding wire is fed to the arc, means including a direct current motor for feeding the wire to the arc, an A. C. supply circuit, rectifying means between the motor and the A. C. supply circuit for delivering to the motor a pulsating direct current derived from the rectification of one-half of the A. C. wave, and means responsive to variations in the arc length for establishing and interrupting the supply of current to the motor.

2. In a welding system of the type wherein a welding wire is fed to the arc, means including a motor for feeding the wire to the arc, A. C. supply conductors, rectifying means for rectifying separately the two halves of the A. C. wave, and means for supplying rectified current to said motor from said rectifying means including a circuit, and directional switching means for controlling the direction of flow of the rectified current to said motor to regulate the feeding of the wire.

3. In a welding machine of the type wherein a welding wire is fed to the arc, means including a D. C. electric motor for feeding the wire, an A. C. supply circuit, rectifying means between the current supply conductors and the motor, a circuit for supplying rectified current from said rectifying means to said motor in one direction, a circuit for supplying rectified current from said rectifying means to said motor in the opposite direction, and switching means for opening one of said circuits and closing the other to control the direction of the rectified current supplied to said motor.

4. In a welding machine of the type wherein a welding wire is fed to the arc, means including a D. C. electric motor for feeding the wire, an A. C. supply circuit, rectifying means between the current supply conductors and the motor, a circuit for supplying rectified current from said rectifying means to said motor in one direction, a circuit for supplying rectified current from said rectifying means to said motor in the opposite direction, and means for interrupting either circuit and connecting the motor to the other circuit, said interrupting and connecting means being controlled and responsive to minor changes in the arc length so as to regulate the feeding of the wire and to maintain the arc at an approximately constant predetermined length.

5. In a welding machine of the type wherein a welding wire is fed to the arc, means including a D. C. electric motor for feeding the wire, an A. C. supply circuit, rectifying means between the current supply conductors and the motor, a circuit for supplying rectified current from said rectifying means to said motor in one direction, a circuit for supplying rectified current from said rectifying means to said motor in the opposite direction, means for interrupting either circuit and connecting the motor to the other circuit, said interrupting and connecting means being controlled and responsive to minor changes in the arc length so as to regulate the feeding of the wire and to maintain the arc at an approximately constant predetermined length, and adjustable means for predetermining the arc length.

6. In a welding system of the type wherein the welding wire is fed to the arc, means comprising a motor for feeding the wire, an A. C. supply circuit, rectifying means between the supply conductors and the motor for rectifying opposite halves of the A. C. current wave, a circuit for supplying rectified current from said rectifying means to said motor in one direction, a circuit for supplying rectified current from said rectifying means to said motor in the opposite direction, and circuit making and breaking means responsive to variations in the arc length for establishing and interrupting the supply of rectified current in either direction.

7. In a welding system of the type wherein a fusible wire is fed to an arc, means including a motor for feeding the wire to the arc, means responsive to variations in the length of the arc for varying the speed of the motor, switching means for controlling the flow of welding current and the supply of current to the motor, and manually operable means for controlling the motor to feed the wire in either direction when the flow of welding current is interrupted.

In testimony whereof, I hereunto affix my signature.

ALLIS M. MacFARLAND.